United States Patent
Vogel et al.

(10) Patent No.: US 11,834,584 B2
(45) Date of Patent: *Dec. 5, 2023

(54) WEATHERABLE AND DURABLE COATING COMPOSITIONS

(71) Applicants: Dow Global Technologies LLC, Midland, MI (US); Dow Silicones Corporation, Midland, MI (US)

(72) Inventors: Erin B. Vogel, Midland, MI (US); Susan Machelski, Midland, MI (US); Ray E. Drumright, Midland, MI (US); Paul J. Popa, Auburn, MI (US); Gary M. Wieber, Midland, MI (US); Gerald Lawrence Witucki, Midland, MI (US); Patrick J. Fryfogle, Midland, MI (US); Adam C. Tomasik, Mount Pleasant, MI (US)

(73) Assignees: DOW GLOBAL TECHNOLOGIES LLC, Midland, MI (US); Dow Silicones Corporation, Midland, MI (US)

( * ) Notice: Subject to any disclaimer, the term of this patent is extended or adjusted under 35 U.S.C. 154(b) by 516 days.

This patent is subject to a terminal disclaimer.

(21) Appl. No.: 17/253,341

(22) PCT Filed: Jul. 17, 2019

(86) PCT No.: PCT/US2019/042238
§ 371 (c)(1),
(2) Date: Dec. 17, 2020

(87) PCT Pub. No.: WO2020/018689
PCT Pub. Date: Jan. 23, 2020

(65) Prior Publication Data
US 2021/0253900 A1 Aug. 19, 2021

Related U.S. Application Data

(60) Provisional application No. 62/700,478, filed on Jul. 19, 2018.

(51) Int. Cl.
C09D 133/12 (2006.01)
C09D 133/14 (2006.01)
C09D 183/08 (2006.01)
C09D 133/06 (2006.01)
C08G 77/26 (2006.01)
C08L 83/08 (2006.01)
C08F 220/32 (2006.01)
C08L 33/14 (2006.01)
C08L 33/06 (2006.01)

(52) U.S. Cl.
CPC ....... *C09D 183/08* (2013.01); *C09D 133/068* (2013.01); *C09D 133/12* (2013.01); *C08F 220/325* (2020.02); *C08G 77/26* (2013.01); *C08L 33/068* (2013.01); *C08L 33/14* (2013.01); *C08L 83/08* (2013.01); *C09D 133/14* (2013.01)

(58) Field of Classification Search
None
See application file for complete search history.

(56) References Cited

U.S. PATENT DOCUMENTS

| | | |
|---|---|---|
| 4,525,521 A | 6/1985 | DenHartog et al. |
| 5,804,616 A | 9/1998 | Mowrer et al. |
| 7,501,473 B2 | 3/2009 | Gordon et al. |
| 8,193,293 B2 | 6/2012 | Martz et al. |
| 8,871,888 B2 | 10/2014 | Mowrer |
| 8,987,378 B2 | 3/2015 | Maksimovic et al. |
| 2004/0220306 A1 | 11/2004 | Kageishi et al. |

FOREIGN PATENT DOCUMENTS

| | | |
|---|---|---|
| CN | 106381084 | 2/2017 |
| JP | 2002167546 | 6/2002 |
| JP | 2002309165 | 10/2002 |
| WO | 0151575 | 7/2001 |

*Primary Examiner* — Richard A Huhn
(74) *Attorney, Agent, or Firm* — Karl Stauss

(57) ABSTRACT

A curable coating composition is provided having multi-functionalized acrylic copolymer and amino-functional silicone resin curing agents. The acrylic copolymer of the curable coating composition has, in polymerized form, epoxy functionalized groups and cure compatibility groups. The coating compositions are useful in the field of superior weatherable and durable coatings and are useful to replace isocyanate-containing polyurethane based coatings. Also provided are coated articles produced from the curable composition.

10 Claims, No Drawings

WEATHERABLE AND DURABLE COATING COMPOSITIONS

This invention relates to curable coating compositions having multi-functionalized acrylic copolymer and amino-functional silicone resin curing agents. More particularly the acrylic copolymer has, in polymerized form, epoxy functionalized groups and cure compatibility groups. The coating compositions are useful in the field of superior weatherable and durable coatings and are useful to replace isocyanate-containing polyurethane based coatings.

Isocyanate-containing polyurethane based coatings are used in applications where superior weatherability and durability are required. However, manufacturers and consumers desire to move to isocyanate-free coatings to limit exposure to such materials; while providing weatherability in addition to chemical and corrosion resistance. In applications where epoxy coatings are used to protect metal, but require good color and gloss retention, the epoxy coatings are further coated over with a topcoat, often a polyurethane. Other coatings derived from epoxy resins, such as polysiloxane-epoxy coatings, are dependent on humidity for cure and often become brittle as the coating continues to cure.

U.S. Pat. No. 8,193,293 discloses a low temperature, ambient curable coating composition comprising an amino-functional polysiloxane; a polysiloxane resin which is the reaction product of a polysiloxane containing silicon hydride and a hydroxyl functional group-containing material having two or more unsaturated bonds capable of undergoing hydrosilylation reaction; and a polyepoxide.

U.S. Pat. No. 8,871,888 discloses a high solids, one-component, storage stable coating composition comprising an epoxy resin comprising more than one 1,2-epoxy groups per molecule; a hydrocarbon compound having a softening point of from 50° C. to 140° C.; an alkoxy-functional and/or silanol-functional silicone; and a ketimine curing agent comprising a reaction product of reactants comprising a polyalkyldiamine component and a ketone component.

International Patent Publication WO 01/51575 A1 discloses an ambient temperature curing coating composition comprising a polysiloxane with alkyl, aryl, alkoxy, reactive glycidoxy and OSi(OR)$_3$ groups; a glycidyl-functional acrylic polymer; and a hardener. The polysiloxane does not contain amine functionality.

Japanese Patent Publication 2002-167546 A discloses a corrosion proof coating material composition for single-coating finishing comprising (A) an acrylic resin, (B) an epoxy resin having at least two epoxy groups, (C) an organosilane compound, and (D) an aminosilane-containing amine curing agent, and as the compounding ratios of the acrylic resin (A), the epoxy resin (B) and the organosilane compound (C), the component (A) is 5-65 wt. %; the component (B) is 30-90 wt. %; and the component (C) is 5-65 wt. %, each based on the total amount of the solid contents of these resins.

What is needed is a coating composition that offers a good balance of properties including UV protection, corrosion resistance, good dry times and chemical resistance without requiring any undercoating or primer layers; all at a cost competitive advantage and using a minimum of materials.

The present invention provides a curable coating composition comprising: (1) an amino-functional silicone resin of the fully condensed formula $R_xSiO_{(4-x)/2}$ where (a) x is a number from 1.0 to 2.1; (b) the amino-functional silicone resin is comprised of the Si units $R_3SiO_{1/2}$, $R_2SiO_{2/2}$, $RSiO_{3/2}$, and $SiO_{4/2}$ in polymerized form, where at least 5 mole percent of the total amount of Si units of the amino-functional silicone resin comprise (i) $RSiO_{3/2}$ groups, (ii) $SiO_{4/2}$ groups or (iii) mixtures thereof; (c) each R is independently an alkyl group, an aryl group, or an amino-functional hydrocarbyl group, provided that the —NH— equivalent mass of the amino-functional silicone resin is from 50 to 750; and (2) an acrylic copolymer which has, in polymerized form, epoxy functionalized groups and cure compatibility groups; and wherein the coating composition has a molar ratio of amine NH functionality to epoxy functionality in the range of from 0.5 to 1.3. The present invention further provides a coated article comprising one or more layers of the cured coating composition.

The term "mole percent" can also be represented as a "mole fraction" whereby 1 mole percent equals a mole fraction of 0.01. For each range presented in the present invention, the lower limit of the range and the upper limit of the range are separable and combinable in any fashion with other lower or upper limits; including in combinations with the lower and upper limits for the ranges of additional components identified in the present invention. All individual values and subranges are included herein and disclosed herein.

The amino-functional silicone resin of the present invention can be described with the fully condensed formula:

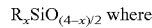

$R_xSiO_{(4-x)/2}$ where (a) x is a number from 1.0 to 2.1;
(b) the amino-functional silicone resin is comprised of the Si units $R_3SiO_{1/2}$, $R_2SiO_{2/2}$, $RSiO_{3/2}$, and $SiO_{4/2}$ in polymerized form, where at least 5 mole percent of the total amount of Si units of the amino-functional silicone resin comprise (i) $RSiO_{3/2}$ groups, (ii) $SiO_{4/2}$ groups or (iii) mixtures thereof; and
(c) each R is independently an alkyl group, an aryl group, or an amino-functional hydrocarbyl group, provided that the —NH— equivalent mass of the amino-functional silicone resin is from 50 to 1000, preferably 50 to 750, more preferred 80 to 900, even more preferred 100 to 800, and most preferred 100-700.

$R_3SiO_{1/2}$ is also referred to as M, $R_2SiO_{2/2}$ is also referred to as D, $RSiO_{3/2}$ is also referred to as T, and $SiO_{4/2}$ is also referred to as Q. In the event a superscript is used next to the M, D, T or Q designations, it refers to the type of R group(s) present. For example, D' mean that one of the two R groups is a phenyl group. Any R group(s) not described by superscripts is to be understood by those skilled in the art as being methyl groups, unless the specific description of the polymer indicates otherwise. The —NH— equivalent mass of the amino-functional silicone resin is determined by obtaining a $^{13}$C-NMR spectrum of a known amount of solution of, or neat sample of, the amino-functional silicone resin and quantifying the peaks associated with the amino-functional Si units of the amino-functional silicone resin relative to those associated with a known amount of an internal standard (typically 1,4-dioxane), then adjusting for solvent content present in the sample, if any, as determined by gas chromatography. The total amount of Si units of the amino-functional silicone resin that comprise (i) $RSiO_{3/2}$ groups, (ii) $SiO_{4/2}$ groups or (iii) mixtures thereof (referred to as T+Q) is at least 5 mole percent, preferably at least 10 mole percent and more preferably at least 20 mole percent. The amino-functional silicone resin is in the form of a neat liquid, solution, or meltable solid. The subscript x is an average value across the distribution of units making up the material and is determined for any given material by using calculations based on NMR spectroscopic data (typically $^{29}$Si-NMR and $^{13}$C-NMR, alternatively $^{29}$Si-NMR and $^{1}$H-NMR).

The alkyl groups are illustrated by methyl, ethyl, propyl, butyl, hexyl, octyl, decyl, dodecyl, hexadecyl, and octadecyl with the alkyl group typically being methyl. The aryl groups are illustrated by phenyl, naphthyl, benzyl, tolyl, xylyl, xenyl, methylphenyl, 2-phenylethyl, 2-phenyl-2-methylethyl, chlorophenyl, bromophenyl and fluorophenyl with the aryl group typically being phenyl. The aminofunctional hydrocarbyl group is illustrated by groups having the formula —$R^1NHR^2$ or —$R^1NHR^1NHR^2$ wherein each $R^1$ is independently a divalent hydrocarbon radical having at least 2 carbon atoms and $R^2$ is hydrogen or an alkyl group. Each $R^1$ is typically an alkylene radical having from 2 to 20 carbon atoms. $R^1$ is illustrated by —$CH_2CH_2$—, —$CH_2CH_2CH_2$—, —$CH_2CHCH_3$—, —$CH_2CH_2CH_2CH_2$—, —$CH_2CH(CH_3)CH_2$—, —$CH_2CH_2CH_2CH_2CH_2$—, —$CH_2CH_2CH_2CH_2CH_2CH_2$—, —$CH_2CH_2CH(CH_2CH_3)CH_2CH_2CH_2$—, —$CH_2CH_2CH_2CH_2CH_2CH_2CH_2CH_2$—, and —$CH_2CH_2CH_2CH_2CH_2CH_2CH_2CH_2CH_2CH_2$—. The alkyl groups $R^2$ are as illustrated above for R. When $R^2$ is an alkyl group it is typically methyl. Typical aminofunctional hydrocarbon groups are —$CH_2CH_2NH_2$, —$CH_2CH_2CH_2NH_2$, —$CH_2CHCH_3NH_2$, —$CH_2CH_2CH_2CH_2NH_2$, —$CH_2CH_2CH_2CH_2CH_2NH_2$, —$CH_2CH_2CH_2CH_2CH_2CH_2NH_2$, —$CH_2CH_2NHCH_3$, —$CH_2CH_2CH_2NHCH_3$, —$CH_2(CH_3)CHCH_2NHCH_3$, —$CH_2CH_2CH_2CH_2NHCH_3$, —$CH_2CH_2NHCH_2CH_2NH_2$, —$CH_2CH_2CH_2NHCH_2CH_2CH_2NH_2$, —$CH_2CH_2CH_2CH_2NHCH_2$, —$CH_2CH_2CH_2NH_2$, —$CH_2CH_2NHCH_2CH_2NHCH_3$, —$CH_2CH_2CH_2NHCH_2CH_2CH_2NHCH_3$, —$CH_2CH_2CH_2CH_2NHCH_2CH_2CH_2CH_2NHCH_3$, and $CH_2CH_2NHCH_2CH_2NHCH_2CH_2CH_3$.

The amino-functional silicone resin having the formula of $R_xSiO_{(4-x)/2}$, has less than 50 mole percent of repeat units bearing OR' groups bound to Si, preferably less than 40 mole percent, preferably less than 30 mole percent, and most preferably less than 20 mole percent; wherein R' is hydrogen or a hydrocarbon group.

The amino-functional silicone resin of the present invention is synthesized according to polymerization methods known in the art. Non-limiting, illustrative polymerization methods are disclosed in U.S. Pat. No. 7,501,473. Examples of commercially available amino-functional silicone resins include SILRES® HP 2000 (an aminofunctional, methyl phenyl silicone resin solution) available from Wacker Chemie AG; and Dow Corning® 3055 (an amino functionalized polysiloxane) available from Dow Corning Corporation, a wholly owned subsidiary of The Dow Chemical Company.

The multi-functionalized acrylic copolymer means a copolymer including a majority amount of copolymerized (meth)acrylic esters, including in polymerized form through the acrylate linkages, epoxy functionalized groups and cure compatibility groups, which retain their functionality on the backbone of the acrylic copolymer. Preferably the multi-functionalized acrylic copolymer is a polar material due in part to the presence of the cure compatibility groups, which while not being bound by any theory, is believed to aid in compatibility with the polar amino-functional silicone resin. This compatibility is best seen by the reduction of haze in the cured coating composition. As used herein, the use of the term "(meth)" followed by another term such as acrylate refers to both acrylates and methacrylates. For example, the term "(meth)acrylate" refers to either acrylate or methacrylate. Similarly, the term "(meth)acrylic acid" refers to methacrylic acid or acrylic acid. The acrylic copolymer is prepared via free radical polymerization in solvent, such as xylene, in which monomers, initiators, optionally chain transfer agents and solvent can be charged into a vessel and reacted at about 60° to 175° C. for about 1-6 hours to form the polymer. Typical solvents which can be used to prepare the acrylic copolymers are the following: toluene, ethyl acetate, butyl acetate, acetone, methyl isobutyl ketone, methylethyl ketone, ethyl alcohol, mineral spirits, ethylene glycol monoethyl ether acetate, and other aliphatic, cycloaliphatic and aromatic hydrocarbon, esters, ethers, ketones and alcohols which are conveniently used. Alternatively the acrylic copolymer can be prepared through free radical emulsion or suspension addition polymerization or by dispersion of a preformed polymer under shear into an aqueous medium. Preferably, the acrylic copolymer of the present invention is solvent-borne.

Monomers suitable for the preparation of acrylic copolymers include (meth)acrylates such as methyl (meth)acrylate, ethyl (meth)acrylate, butyl (meth)acrylate, 2-ethylhexyl (meth)acrylate, and combinations thereof. Additional monomers may be used to prepare the acrylic copolymer including carboxylic acid monomers such as (meth)acrylic acid and itaconic acid, and salts thereof; sulfonic acid monomers such as sodium styrene sulfonate and acrylamido-methylpropane sulfonate and salts thereof; and phosphoric acid monomers such as phosphoethylmethacrylate and salts thereof. Monomers such as styrene, acrylonitrile, acetoacetoxyethyl methacrylate (AAEM), and alkoxysilane functional (meth)acrylate, as well as monomers capable of imparting co-curable functionality such as glycidyl (meth)acrylates and hydroxyalkyl (meth)acrylates, may also be used in the preparation of the acrylic copolymer. In certain embodiments, it may be advantageous to incorporate into the acrylic copolymer small amounts of copolymerized multi-ethylenically unsaturated monomer groups, including allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene. It may also be advantageous to incorporate such monomer groups non-uniformly into the polymer to form multiphase polymer particles to create a core-shell, hemispherical, or occluded morphology. Chain transfer agents may be used to prepare these acrylic copolymers, examples of which include dodecylmercaptan, 2-mercaptoethanol, mercaptotrialkoxy silane, butylmercaptopropionate, methylmercaptopropionate, and mercaptopropionic acid. Initiators may be used to prepare these acrylic copolymers, examples of which include peroxy and azo compounds.

The epoxy functionalized groups of the acrylic copolymer comprise glycidyl groups such as glycidyl methacrylate (GMA) or glycidyl acrylate; with preference to GMA. The cure compatibility groups of the acrylic copolymer comprise monomer groups, in polymerized form, that contain one or more of alcohol (OH) functionality, a phenolic group, a tertiary amine or an acid group that is either pendant to the backbone (as with acrylic monomers) or attached as an end group, such as where an OH functional chain transfer agent is used in the polymerization. Preferably the cure compatibility group is hydroxyethyl (meth)acrylate (HEMA or HEA). Preferably the acrylic copolymer is synthesized from monomers including GMA, HEMA, methyl methacrylate (MMA), and 2-ethylhexyl acrylate (EHA).

The acrylic copolymer contains 30-80% glycidyl (meth)acrylate monomer units by weight based on the weight of the total monomer units added to produce the copolymer; preferably 40-60% glycidyl (meth)acrylate monomer; and most preferably greater than 30% glycidyl (meth)acrylate monomer on the bottom of the range. The acrylic copolymer contains up to 20% cure compatibility group monomer units by weight based on the weight of the total monomer units added to produce the copolymer; preferably up to 10% cure compatibility group monomer units; preferably up to 8% cure compatibility group monomer units; and preferably greater than to 2% cure compatibility group monomer units, with a preferred range of 5 to 10%. The upper bound of the cure compatibility group is determined primarily by the viscosity of the copolymer when incorporating HEMA with GMA functional groups. Theoretically it is possible to have a higher content of cure compatibility groups when using other monomers such as with the combination of HEA and glycidyl acrylate. The acrylic copolymer contains an epoxy equivalent weight (EEW) in the range of 200-600 as determined in accordance with ASTM D1652; preferably with a lower limit greater than 250, more preferably greater than 275; and preferably with an upper limit less than 500, more preferably less than 450; and with a preferred range of 300-400.

The acrylic copolymer has a calculated glass transition temperature ("Tg") of eighty degrees Celsius (80° C.) or less, preferably 30° C. or less, most preferably 15° C. or less, with a preferred range of −40° C. to 10° C. The Tg is arrived at by selection of monomers and amounts of monomers to achieve the desired polymer Tg, as is well known in the art. Tgs of polymers are measured using Dynamic Scanning calorimetry.

The acrylic copolymer solutions are viscous liquids with a viscosity in the range of 500 centipoise (cP) to 8,000 cP at room temperature (25° C.) at around 70% solids. The acrylic copolymer of the present invention has a number average molecular weight of from 500 to 10,000 g/mol, preferably 1,000-5,000 g/mol or more, or, more preferably, 4,000 g/mol or less, as measured by Gel Permeation Chromatography using polystyrene standards.

The coating composition of the present invention comprises the acrylic copolymer and the amino-functional silicone resin. The molar ratio of amine NH functionality to epoxy functionality is in the range of from 0.5 to 1.3; preferably 0.8 to 1. Preferably it is best to avoid an excess of amine groups as this can lead to amine blush which is bad for exterior durability. Amine blush causes a loss of gloss upon exposure to water. The coating composition is typically subjected to ambient cure, though accelerated curing is possible.

The coating composition of the present invention may contain additional compositions including without limitation: accelerators/plasticizers such as benzyl alcohol, salicylic acid, and tris-2,4,6-dimethylaminomethyl phenol; fillers such as finely divided minerals including silica, alumina, zirconia, talc, sulfates, $TiO_2$, carbon black, graphite, silicates and the like; other curing agents; other epoxy resins; reinforcing agents; rheology modifiers; solvents; accelerators; surfactants; ultra-violet (UV) stabilizers; antioxidants; wetting agents; solvents; defoamers; toughening agents; and colorants including pigments, dyes, and tints.

Curable coating compositions of the present invention can be un-pigmented transparent clear coats, or pigmented systems for primer, basecoat and topcoat applications. The pigment may be any typical organic or inorganic pigment. Several different pigments may be needed to achieve a desirable color for a particular application. Examples of suitable pigments include without limitation, titanium dioxide, opaque polymers, barytes, clay, calcium carbonate, red iron oxide, CI Pigment Yellow 42, CI Pigment Blue 15, 15:1, 15:2, 15:3, 15:4 (copper phthalocyanines), CI Pigment Red 49:1, CI Pigment Red 57:1 and carbon black.

The resulting coating compositions can be applied onto a substrate using techniques known in the art; e.g. by spraying, brushing, draw-down, roll-coating. The nominal dry film thickness (DFT) of the coating is greater than or equal to 1 mil, preferably greater than or equal to 2 mils, preferably greater than or equal to 2.5 mils and more preferably greater than or equal to 3 mils. 1 mil equals $\frac{1}{1000}$ of an inch. Examples of substrates that may be coated include without limitation, plastics, wood, metals such as aluminum, steel or galvanized sheeting, tin-plated steel, concrete, glass, composites, urethane elastomers, primed (painted) substrates, and the like. The coatings can be cured at room temperature or at an elevated temperature in a forced air oven or with other types of heating sources.

The following examples are illustrative of the invention.

EXAMPLES AND EXPERIMENTAL METHODS

Acrylic Copolymers

Xylene was added to a 500 mL 4 neck round bottomed flask, equipped with stir shaft, condenser, thermocouple port and addition ports. A heating mantle was used to bring the temperature of the xylene up to reflux (140° C.). A monomer blend consisting of glycidyl methacrylate (GMA), methyl methacrylae (MMA), 2-ethylhexyl acrylate (EHA), and 2-hydroxyethyl methacrylate (HEMA) was weighed out and mixed in a 500 mL glass jar then divided equally into 50 mL plastic feed syringes with Luer Lock connectors. The initiator, tert-butylperoxyacetate (TBPA, 50% in mineral spirits) was added to a single 50 mL plastic syringe and connected to feed tubing via the Luer Lock connection with long feed needle attachment. A dual syringe pump was used to add monomer mix at a constant feed rate and a single feed syringe pump was used to feed the initiator. The feeds were initiated when the solvent was at reflux. The feed rate time and temperature are dependent on the solvent and the half-life of the initiator. Once feeds were depleted the lines were flushed with small amount of solvent. Run was continued for an additional hour to reduce residual monomer and initiator to acceptable levels. Table 1 shows the acrylic copolymers made.

TABLE 1

| | Acrylic copolymers | | | | | | | | | |
|---|---|---|---|---|---|---|---|---|---|---|
| Acrylic | | GMA | MMA | EHA | HEMA | TBPA | xylene | % solids | Tg ° C. | EEW g/mol epoxy, as measured | EEW g/mol epoxy, on solids |
| A1 | Wt % of monomer composition | 40 | 25 | 35 | 0 | | | 75% | −2 | 535 | 400 |
| | grams | 400 | 250 | 350 | 0 | 120 | 293 | | | | |

TABLE 1-continued

Acrylic copolymers

| Acrylic | | GMA | MMA | EHA | HEMA | TBPA | xylene | % solids | Tg °C. | EEW g/mol epoxy, as measured | EEW g/mol epoxy, on solids |
|---|---|---|---|---|---|---|---|---|---|---|---|
| A2 | Wt % of monomer composition | 45 | 17.5 | 35 | 2.5 | | | 72% | −4 | 456 | 330 |
| | grams | 450 | 175 | 350 | 25 | 120 | 293 | | | | |
| A3 | Wt % of monomer composition | 40 | 20 | 35 | 5 | | | 73% | −2 | 520 | 380 |
| | grams | 400 | 200 | 350 | 50 | 120 | 293 | | | | |
| A4 | Wt % of monomer composition | 50 | 10 | 30 | 10 | | | 73% | −3 | 400 | 300 |
| | grams | 150 | 30 | 90 | 30 | 36 | 88 | | | | |

Acrylic Copolymer Characterization

GPC

Sample was dissolved 2 mg/mL in tetrahydrofuran (THF); solutions were filtered through 0.2 μm PTFE syringe filter prior to injection. Molecular weight measurements were performed with GPC measured on an Agilent 1100 series with MIXED-D columns (300×7.5 mm) at a flow rate of 1.0 mL/min at 35° C. Agilent refractive index detector is used by Agilent GPC/SEC software. Calibration is preformed using 17 narrow PS standards from Polymer labs, fit to a 3rd order polynomial curve over the range of 3,742 kg/mol to 0.580 kg/mol.

EEW

EEW is measured in accordance with ASTM D1652. The epoxy resin is dissolved in methylene chloride and titrated with standardized 0.1N perchloric acid (HC104) in glacial acetic acid in the presence of excess tetraethyl ammonium bromide (TEAB) in acetic acid. Measurements were performed using a Metrohm 905 titrator and the associated Tiamo titration software configured for EEW determinations.

Percent Solids

Label the bottom of a small aluminum pan, place the pan on a scale and record its weight to the closest 0.0000. Distribute approximately 0.5 g-1.5 g of sample evenly in the pan using a pipette. Record that weight as initial (pan+sample). Place on baking pan and clip down with a binder clip before putting sample in oven, cover resin with about 2 grams of toluene using pipette, then carefully place in pre-heated Class A oven. After 2 hours, remove baking pan and samples from the oven. Tare balance and place sample (and pan) on balance and record final weight, and calculate the solids content by the formula:

Solids %=(Final weight−pan weight)/(initial weight−pan weight)*100

Glass Transition Temperature

The $T_g$ was measured with Differential Scanning calorimetry DSC Q2000 V24.10 in accordance with ASTM D7426 with a sample size of about 5-10 mg. The temperature profiles performed as followed: Isotherm at 10° C. for 5 minutes. Ramp to −50 C @ 10° C./minute, isotherm for 5 minutes, ramp to 150 C @ 10°/minute, isotherm for 5 minutes, Tg was analyzed with TA software Viscosity Viscosity measurements were taken using the Brookfield DV-III Ultra viscometer with the Small Sample Adapter (SSA). The Small Sample Adapter's rheologically correct cylindrical geometry provides extremely accurate viscosity measurements and shear rate determinations. For these samples 9 mL of material was deposited into the cylinder and spindles #31 or #34 were used and the speed was varied to achieve at torque of −25. Measurements were reported in unites of centipoises (cP).

Amino-Functional Silicone Resins

Amino-functional silicone resin SA1 is a reaction product of hydrolysis and condensation of the following mixture of silanes: phenyltrimethoxysilane (25 wt %), diphenyldimethoxysilane (31 wt %), and hexamethyldisiloxane (HMDS, 17 wt %), with water (1.2 mole/mole Si), catalyzed by trifluoromethanesulfonic acid (TFMSA, 750 ppm relative to the silanes mixture), followed by addition of γ-Aminopropyldiethoxymethylsilane (APDEMS, 27 wt %) to enable its hydrolysis and co-condensation into the silicone resin. Upon removal of by-product alcohols, n-heptane was added, water removed via azeotropic distillation, the reaction mixture filtered and solvent removed by distillation.

Amino-functional silicone resins SB1-SB3 were prepared in the following manner. A mixture of phenyltrimethoxysilane, γ-aminopropyldiethoxymethylsilane (APDEMS), optionally phenylmethyldimethoxysilane, dimethyldimethoxysilane, and/or methyltrimethoxysilane, catalyzed by potassium hydroxide (45% KOH) was optionally dissolved in aromatic solvent (xylenes), hydrolyzed with water, and heated to reflux for three hours. The base catalyst was neutralized by addition of aqueous hydrochloric acid (37% HCl), by-product alcohol removed by distillation and the product filtered. The amount of each ingredient is shown in Table 2. The final amino-functional silicone resin composition and —NH— (amine H) equivalent weight are shown in Table 3.

Amino-functional silicone resins SC1 and SC2 were prepared in the following manner A mixture of phenyltrimethoxysilane and γ-aminopropyldiethoxymethylsilane (APDEMS), xylenes, and catalytic potassium hydroxide (45% KOH) was hydrolyzed with water, followed by distillative removal of by-product alcohol. Additional water was added, and removed by azeotropic distillation. The base catalyst was neutralized with aqueous hydrochloric acid (37% HCl) and water removed via azeotropic distillation. The mixture was filtered and concentrated by distillative removal of a portion of solvent to yield the product amino-functional silicone resin. The amount of each ingredient is shown in Table 2. The final amino-functional silicone resin composition and —NH— (amine H) equivalent weight are shown in Table 3.

Amino-functional silicone SD1 was prepared in the following manner: Aminoethylaminoisobutyldimethoxymethylsilane (AEAiBDMMS) was hydrolyzed with water (3.0 mole/mole Si), followed by distillative removal of by-product alcohol. The final amino-functional silicone resin composition and —NH— (amine H) equivalent weight is shown in Table 3.

was targeted to achieve the desired dry film thickness of ~2.5 mils.

Coating Formulation: Pigmented Coatings

The pigmented coating composition SE7 was prepared as follows: 30 g acrylic copolymer A4, 0.09 g Dow Corning Additive DC-7, 0.29 g BYK 118, and 29.4 g TS-6200 TiO$_2$ pigment were measured into a MAX 100 SpeedMixer™ cup; the cup was mixed 5 minutes @ 3000 rpm with SpeedMixer™ model DAC150 FV2-K from FlackTek, Inc. Landrum, SC 29356; fineness of the grind was measured using a Hegman Gauge to assure a value of >6; 9.75 g N-Butyl acetate, 3.0 g Aromatic 100, 1.37 g HALS 292, and 0.09 g Dow Corning Additive DC-11 were added; the mixture was mixed 1 min @ 1500 rpm and allowed to rest overnight; the grind was then mixed for 1 minute @ 1500 rpm followed by adding 19.2 g of amino-functional silicone resin SA1; and the final mixture was mixed 2 minutes @ 1500 rpm, followed by adding about 7 g xylene to lower viscosity for spray, as needed. The molar ratio of amine functionality to epoxy functionality is 1:1.

Comparative Example 4 was prepared in the same manner as coating composition SE7, except that Aradur® 2978-1 was used in place of amino-functional silicone resin SA1. The molar ratio of amine functionality to epoxy functionality is 1:1.

Disperbyk 118, available from BYK Gardner is a wetting and dispersing additive for solvent-borne systems to stabilize acidic, neutral and basic titanium dioxides. DOW CORNING® 7 ADDITIVE, available from The Dow Chemical Company, provides foam prevention and defoaming plus leveling and wetting in solvent-borne systems. TS-6200, available from Chemours, is a TiO$_2$ pigment. Butyl acetate, available from The Dow Chemical Company, is a solvent. Aromatic 100, available from The Dow Chemical Company, is a tail solvent. Tinuvin® 292, available from

TABLE 2

| | Mass (g) | | | | | | | |
| --- | --- | --- | --- | --- | --- | --- | --- | --- |
| Example | Me$_2$Si(OMe)$_2$ | PhMeSi(OMe)$_2$ | APDEMS | PhSi(OMe)$_3$ | MeSi(OMe)$_3$ | Xylene | Water | 45% KOH | 37% HCl |
| SB1 | | 95.0 | 224.3 | 180.8 | | | 51.8 | 1.1 | 0.9 |
| SB2 | | | 220.9 | 229.0 | | | 49.5 | 0.5 | 0.4 |
| SB3 | 177.5 | | 565.5 | 146.6 | 302.0 | 561.3 | 150.3 | 2.6 | 2.1 |
| SC1 | | | 48.5 | 451.6 | | 324.5 | 65.0 | 1.1 | 0.9 |
| SC2 | 665.0 | | 106.8 | 805.0 | | | 199.9 | 1.8 | 1.4 |

Me refers to methyl and Ph refers to phenyl.

TABLE 3

| Example | Amino-functional silicone resin | -NH- Equivalent Mass (g/mol NH) | Mole fraction T + Q in amino-functional silicone resin | Mole fraction OH + OR' in amino-functional silicone resin |
| --- | --- | --- | --- | --- |
| SA1 | R$_{2.05}$SiO$_{0.975}$ | 257 | 0.234 | 0.038 |
| SB1 | R$_{1.66}$SiO$_{1.17}$ | 146 | 0.341 | 0.115 |
| SB2 | R$_{1.51}$SiO$_{1.25}$ | 83 | 0.492 | 0.148 |
| SB3 | R$_{1.59}$SiO$_{1.21}$ | 121 | 0.405 | 0.120 |
| SC1 | R$_{1.10}$SiO$_{1.45}$ | 626 | 0.900 | 0.018 |
| SC2 | R$_{1.59}$SiO$_{1.21}$ | 1,060 | 0.405 | 0.166 |
| SD1 | R$_{1.99}$SiO$_{1.00}$ | 58 | 0.009 | 0.079 |

Coating Formulation: Clear Coatings

The clear coating compositions of Table 4 were prepared by the following manner: the acrylic copolymer was placed in a MAX 40 SpeedMixer™ cup and the amino-functional silicone resin was added and mixed for 2 minutes at 2000 rpm in FlackTek™ DAC150 SpeedMixer™.

TABLE 4

| | Acrylic Copolymer | g Acrylic resin (in solvent) | Amino-functional silicone resin | g amino-functional silicone resin (including solvent) | % solids of amino-functional silicone resin | Molar ratio of amine functionality to epoxy functionality |
| --- | --- | --- | --- | --- | --- | --- |
| Comparative Example 1 | A1 | 15 | SB1 | 4.1 | 100% | 1:1 |
| SE 1 | A2 | 15 | SB1 | 7.1 | 100% | 1:1 |
| SE 2 | A3 | 15 | SB1 | 4.2 | 100% | 1:1 |
| SE 3 | A4 | 15 | SA1 | 9.8 | 100% | 1:1 |
| SE 4 | A4 | 15 | SB2 | 6.4 | 49% | 1:1 |
| SE 5 | A4 | 6 | SC1 | 13.7 | 68% | 1:1 |
| SE 6 | A4 | 15 | SB3 | 6.8 | 61% | 1:1 |
| Comparative Example 2 | A4 | 5 | SC2 | 16.7 | 79% | 1:1 |
| Comparative Example 3 | A4 | 15 | SD1 | 2.2 | 100% | 1:1 |

Draw Down Application Method for Clear Coat Applications

A coating was applied to Q-Panel R-412-I (phosphate treated cold rolled steel) and AL 412 (chromate treated aluminum) panels according to ASTM D4147. The panel was secured on a firm horizontal surface using a magnetic chuck or clamp. A multiple clearance square applicator was used to apply coating to the panel, 5 to 6 mil wet thickness BASF Corporation, is a liquid hindered amine light stabilizer. DOW CORNING® 11 ADDITIVE, available from The Dow Chemical Company, provides slip, mar resistance and leveling in solvent-borne systems; also prevents pigment separation. Xylene, available from Fisher, is a thinner/solvent. Aradur® 2978-1, available from Huntsman Advanced Materials, is a low-color, ambient-cure, low-viscosity, cycloaliphatic amine.

Coating Application and Test Methods

Spray Application: Three types of panels were used in the studies (phosphate treated cold rolled steel (CRS), blasted steel, and chromate treated aluminum panels) the phosphate treated and blasted steel panels were cleaned with either a degreaser or shop solvent prior to being sprayed. Paints were put in disposable spray containers equipped with a 200 μm filter and either a 1.4 mm or a 1.8 mm atomizing head was used. The panels were place on a wire rack and sprayed using conventional, air assisted application with 3M™ Accuspray™ System industrial sprayer. Panels were allowed to cure in the lab at a controlled temperature and humidity of 72° F. and 50% relative humidity.

Dry Time: Coatings were drawn down onto 1"×12" glass substrates with a wet film thickness of 76 micrometers (μm) and set on a BYK drying time recorder. The set-to-touch, tack-free time, and dry hard were measured by dragging a needle through the coating using a BYK drying time recorder according to ASTM D5895-03.

Pendulum Hardness: Pendulum hardness was measured using a Pendulum Hardness Tester from BYK Gardner equipped with a Konig pendulum. The tester was run according to ISO 1522 and set to measure hardness in seconds.

Gloss: The 20°, 60°, and 85° gloss of the coatings were measured according to ASTM D-523-89 using a micro-TRI-gloss meter from BYK Gardner.

Haze: Haze in a clear-coat formulation is measured in accordance with ASTM E430 Test Method B with the micro-haze plus meter from BYK. Coatings were drawn down at 76 um on glass panel and measurements were taken over black Lenta chart. Measurements were logarithmic scaling with brightness compensation.

Methyl Ethyl Ketone Double Rub Test: The methyl ethyl ketone (MEK) double rub test was performed according to ASTM D5402 using the semi-automatic MEK Rub Test machine made by DJH DESIGNS INC. The testing continued until the coating was rubbed through to the substrate or a maximum of 200 double rubs were completed without breakthrough.

Chemical Resistance: The chemical resistance testing was in accordance with ASTM D1308. A couple drops of specified chemicals (including Water, 3% Acetic acid in water, 10% sulfuric acid, 10% sodium hydroxide solution, 3% Sodium Chloride in Water, Toluene, Ethanol, and Methanol) were deposited onto coated panel. For those chemicals with low surface tension or quick evaporation, filter papers with (25 mm dia.) were put on the coatings prior to insulting with chemical. Plastic caps were then put on to cover the droplets or the saturated filter papers. Data were recorded after soaking for 24 hrs. The rating scale was as follows:

5 No visible affect
4 Slight blush
3 Major blush, Slight blister, change in touch
2 Major blisters
1 Coating failure Accelerated Weathering Using QUV: The weathering of the coatings was determined by monitoring the gloss retention over time as the panel were exposed to ultraviolet light. The test was carried out in accordance to ASTM G-53. Cured coating samples on aluminum panels were placed into a QUV unit (Q-Lab model QUV/se). The QUV chamber cycled between 60° C. at 0.89 W/m^2 irradiance for 8 hours and a condensation cycle 50° C. for 4 hours.

The performance characteristics of the coating compositions are shown in Tables 5 through 10. Table 5 illustrates the importance of a cure compatibility group (e.g. HEMA) in the acrylic copolymer, providing compatibility (higher HA reading), improved dry time and improved 20 degree gloss readings. Table 6 illustrates the compositional range of the amino-functional silicone resins and subsequent performance. Table 7 shows weatherability performance for coating compositions of the present invention. Tables 8 through 10 illustrate the ability to provide a pigmented coating and a comparative example of non-Si amine based coating.

TABLE 5

| Examples | Set-to-Touch Time (hr) | Tack-Free Time (hr) | Dry-Hard Time (hr) | 20° Gloss | 60° Gloss | Thickness (mils) | 7 day König hardness (sec) | HA on glass over black lenta |
|---|---|---|---|---|---|---|---|---|
| Comp Ex 1 | 0.16 | 10.3 | >24 | 80 | 89 | 3.95 | 12 | 223 |
| SE 1 | 0.48 | 2.6 | 3.4 | 89 | 98 | 4.50 | 45 | 414 |
| SE 2 | 0.40 | 1.5 | 2.5 | 93 | 104 | 4.15 | 54 | 428 |

TABLE 6

| Examples | Set-to-Touch Time (hr) | Tack-Free Time (hr) | Dry-Hard Time (hr) | 20° Gloss | 60° Gloss | Thickness (mils) | 7 day König hardness (sec) | MEK double rubs |
|---|---|---|---|---|---|---|---|---|
| SE 3 | 1.0 | 3.0 | 6.8 | 105 | 110 | 3.5 | 91 | >200 |
| SE 4 | 0.1 | 0.9 | 3.1 | 93 | 104 | 3.3 | 98 | >200 |
| SE 5 | 0.1 | 0.2 | 4.7 | 92 | 102 | 2.4 | 117 | >200 |
| SE 6 | 0.8 | 1.4 | 7 | 87 | 100 | 2.5 | 69 | >200 |
| Comp Ex 2 | 5.1 | 9.5 | >24 | 88 | 101 | 2.6 | 16 | 180 |
| Comp Ex 3 | — | — | — | — | — | — | — | — |

Comparative Example 3 failed to form a continuous film and could not be tested.

TABLE 7

| Examples | 500 hr % gloss retention | 1000 hr % gloss retention | 1500 hr % gloss retention | 2000 hr % gloss retention |
|---|---|---|---|---|
| SE 3 | 100 | 100 | 100 | 97 |
| SE 4 | 98 | 97 | 96 | 93 |
| SE 5 | 100 | 100 | 100 | 100 |
| SE 6 | 96 | 95 | 92 | 89 |

TABLE 8

| Examples | Set-to-Touch Time (hr) | Tack-Free Time (hr) | Dry-Hard Time (hr) | 20° Gloss | 60° Gloss | Thickness (mils) | 7 Day hardness | 25% Film Loss or 200 rubs |
|---|---|---|---|---|---|---|---|---|
| SE 7 | 1.3 | 4 | 7 | 93 | 97 | 2.8 | 82 | >200 |
| Comp Ex 4 | 1.5 | 4 | 7 | 80 | 91 | 2 | 113 | >200 |

TABLE 9

| Examples | 24 hr Water Resistance | 24 hr 10% H2SO4 Resistance | 24 hr 10% NaOH Resistance | 24 hr Gasoline Resistance | 24 hr Antifreeze Resistance |
|---|---|---|---|---|---|
| SE 7 | 5 | 5 | 4 | 4 | 5 |
| Comp Ex 4 | 5 | 2 | 4 | 4 | 4 |

TABLE 10

| Examples | 500 hr gloss retention | 1000 hr gloss retention | 1500 hr gloss retention | 2000 hr gloss retention |
|---|---|---|---|---|
| SE 7 | 100 | 98 | 95 | 94 |
| Comp Ex 4 | 55 | 21 | 14 | 10 |

The invention claimed is:

1. A curable coating composition comprising:
(1) an amino-functional silicone resin of the fully condensed formula $R_xSiO_{(4-x)/2}$ where (a) x is a number from 1.0 to 2.1;
(b) the amino-functional silicone resin is comprised of the Si units $R_3SiO_{1/2}$, $R_2SiO_{2/2}$, $RSiO_{3/2}$, and $SiO_{4/2}$ in polymerized form, where at least 5 mole percent of the total amount of Si units of the amino-functional silicone resin comprise (i) $RSiO_{3/2}$ groups, (ii) $SiO_{4/2}$ groups or (iii) mixtures thereof;
(c) each R is independently an alkyl group, an aryl group, or an amino-functional hydrocarbyl group, provided that the —NH— equivalent mass of the amino-functional silicone resin is from 50 to 750; and
(2) an acrylic copolymer which has, in polymerized form, epoxy functionalized groups and cure compatibility groups; and
wherein the coating composition has a molar ratio of amine NH functionality to epoxy functionality in the range of from 0.5 to 1.3.

2. The coating composition of claim 1 having a molar ratio of amine NH functionality to epoxy functionality in the range of from 0.8 to 1.

3. The coating composition of claim 1 wherein the amino-functional silicone resin has less than 30 mole percent of repeat units bearing OR' groups bound to Si; wherein R' is hydrogen or a hydrocarbon group.

4. The coating composition of claim 1 wherein the amino-functional silicone resin has at least 10 mole percent of the total amount of Si units of the amino-functional silicone resin comprise (1) $RSiO_{3/2}$ groups, (2) $SiO_{4/2}$ groups or (3) mixtures thereof.

5. The coating composition of claim 1 wherein the epoxy functionalized groups of the acrylic copolymer are derived from one or more monomers selected from the group of glycidyl methacrylate (GMA), glycidyl acrylate, and mixtures thereof; and wherein the acrylic copolymer has an epoxy equivalent weight (EEW) in the range of 200-600.

6. The coating composition of claim 4 wherein the acrylic copolymer comprises in polymerized form, 30-60% glycidyl (meth)acrylate monomer units by weight based on the weight of the total monomer units of the acrylic copolymer.

7. The coating composition of claim 1 wherein the acrylic copolymer comprises in polymerized form, from 2% to 20% cure compatibility group monomer units by weight based on the weight of the total monomer units of the acrylic copolymer.

8. The coating composition of claim 1 wherein the cure compatibility groups of the acrylic copolymer comprise monomer groups, in polymerized form, that contain one or more of alcohol (OH) functionality, a phenolic group, a tertiary amine or an acid group that is either pendant to the backbone or attached as an end group.

9. The coating composition of claim 1 wherein the cure compatibility group is derived from hydroxyethyl methacrylate (HEMA).

10. A coated article comprising one or more layers of a cured coating composition of claim 1.

* * * * *